United States Patent
Tanabe et al.

(10) Patent No.: US 8,158,747 B2
(45) Date of Patent: Apr. 17, 2012

(54) METHOD OF MANUFACTURING A MOLDED ARTICLE

(75) Inventors: Seiichi Tanabe, Tokyo (JP); Yoshiaki Abe, Tokyo (JP)

(73) Assignee: Teijin Chemicals, Ltd., Tokyo (JP)

(*) Notice: Subject to any disclaimer, the term of this patent is extended or adjusted under 35 U.S.C. 154(b) by 243 days.

(21) Appl. No.: 12/449,689

(22) PCT Filed: Feb. 26, 2008

(86) PCT No.: PCT/JP2008/053725
§ 371 (c)(1),
(2), (4) Date: Nov. 20, 2009

(87) PCT Pub. No.: WO2008/105553
PCT Pub. Date: Sep. 4, 2008

(65) Prior Publication Data
US 2010/0076172 A1    Mar. 25, 2010

(30) Foreign Application Priority Data
Feb. 27, 2007    (JP) .................................. 2007-046786

(51) Int. Cl.
*C08G 64/00*    (2006.01)
*C08G 63/02*    (2006.01)

(52) U.S. Cl. ........ 528/370; 359/109; 359/642; 528/196; 528/198

(58) Field of Classification Search ............... 359/109, 359/642; 528/196, 198
See application file for complete search history.

(56) References Cited

U.S. PATENT DOCUMENTS

| | | | |
|---|---|---|---|
| 4,383,092 A | 5/1983 | Ko et al. | |
| 5,973,101 A | 10/1999 | Toshida et al. | |

FOREIGN PATENT DOCUMENTS

| | | |
|---|---|---|
| CN | 1444617 | 9/2003 |
| JP | 4/7328 | 1/1992 |
| JP | 4-7329 | 1/1992 |
| JP | 4-72327 | 3/1992 |
| JP | 4-88017 | 3/1992 |
| JP | 7-109343 | 4/1995 |
| JP | 11-106634 | 4/1999 |
| JP | 2000-177845 | 6/2000 |
| JP | 2000-197817 | 7/2000 |
| JP | 2001-81302 | 3/2001 |
| JP | 2001-192544 | 7/2001 |
| JP | 2001-302782 | 10/2001 |
| JP | 2003-34721 | 2/2003 |
| WO | 01/92371 | 12/2001 |

OTHER PUBLICATIONS

International Search Report issued Jun. 30, 2008 in International (PCT) Application No. PCT/JP2008/053725 of which the present application is the U.S. National Stage.
International Preliminary Report on Patentability (PCT/IB/338, PCT/IB/373) and translation of Written Opinion of the International Searching Authority (PCT/ISA/237) issued Sep. 11, 2009 in International Application No. PCT/JP2008/053725, of which the present application is the U.S. National Stage.
English translation of the Chinese Office Action issued Mar. 23, 2011 in corresponding Chinese Application No. 200880001117.4.

*Primary Examiner* — Terressa Boykin
(74) *Attorney, Agent, or Firm* — Wenderoth, Lind & Ponack, L.L.P.

(57) ABSTRACT

A method for manufacturing a molded article by melting and molding a granule of a polycarbonate resin at a temperature of 280 to 380° C., wherein the granule satisfies condition (a): when 100 parts by weight of the granule is cleaned with 100 parts by weight of a 1N nitric acid aqueous solution, the amount of an Fe compound eluted into the cleaning liquid of the 1N nitric acid aqueous solution is 1 to 100 ppb in terms of an Fe atom based on the granule. The molded article exhibits excellent color and transparency.

7 Claims, No Drawings

METHOD OF MANUFACTURING A MOLDED ARTICLE

TECHNICAL FIELD

The present invention relates to a method of manufacturing a molded article having a good color and excellent transparency from a granule of a polycarbonate resin having excellent heat resistance.

BACKGROUND OF THE ART

A polycarbonate resin is a material which has relatively higher heat resistance than other polymer materials. Due to growing demand for materials having a higher function and higher performance, attempts have been made to provide characteristic features by mixing additives such as a release agent and an ultraviolet absorber into the polycarbonate resin. However, when these additives are mixed, the material tends to deteriorate in heat resistance. For instance, a release agent is often mixed into a resin composition to improve the releasability from a metal mold of a resin molded product at the time of melt molding. When this release agent is added in an effective amount, there is a case where the polycarbonate resin is colored due to the decomposition of the release agent itself at the time of thermal molding or the deterioration of the polycarbonate resin induced by the decomposed product of the release agent.

A large number of proposals have been made to improve the heat resistance of the polycarbonate resin. Most of them are directed to a method in which a phosphorus-based, sulfur-based or hindered phenol-based heat stabilizer is mixed into a polycarbonate resin (refer to patent documents 1 and 2). Although the method in which the heat stabilizer is mixed is effective in improving the heat resistance of the polycarbonate resin, even when the stabilizer is added, satisfactory heat resistance may not be obtained. When a large amount of the heat stabilizer is used, it may reduce the mechanical properties and hydrolytic resistance of the polycarbonate resin.
(patent document 1) JP-A 2001-081302
(patent document 2) JP-A 2001-192544

DISCLOSURE OF THE INVENTION

It is an object of the present invention to provide a method of manufacturing a molded article having an excellent color and transparency from a polycarbonate resin.

The inventors of the present invention have conducted intensive studies on the cause of coloring when a granule of a polycarbonate resin is melt molded. As a result, they have found that when rust in tanks for blending and storing the granule adheres to the granule, a molded article obtained by melt molding is colored. They have also found that when the granule is put into a bag having a polyethylene film containing amide compounds as additives on the inner surface and transported, the amide compounds adhere to the surface of the granule and a molded product obtained by melt molding the granule is colored. The present invention is based on these findings.

That is, the present invention is a method of manufacturing a molded article by melting and molding a granule of a polycarbonate resin at a temperature of 280 to 380° C., wherein the granule satisfies the following condition (a):
(a) when 100 parts by weight of the granule is cleaned with 100 parts by weight of a 1N nitric acid aqueous solution, the amount of an Fe compound eluted into the cleaning liquid of the 1N nitric acid aqueous solution is 1 to 100 ppb in terms of an Fe atom based on the granule.

Preferably, the granule satisfies the following condition (b) in addition to the condition (a):
(b) when 100 parts by weight of the granule is cleaned with 100 parts by weight of MeOH, the total amount of oleic amide, erucic amide and stearic amide eluted into the cleaning liquid of MeOH is 1 to 50 ppb based on the granule.

The molded article is preferably an optical lens. The molded article is also preferably a spectacle lens.

The present invention is a method of preventing the coloration of a molded article when a granule of a polycarbonate resin is molded, wherein the granule satisfies the following condition (a):
(a) when 100 parts by weight of the granule is cleaned with 100 parts by weight of a 1N nitric acid aqueous solution, the amount of an Fe compound eluted into the cleaning liquid of the 1N nitric acid aqueous solution is 1 to 100 ppb in terms of the Fe atom based on the granule.

Preferably, the granule satisfies the following condition (b) in addition to the condition (a):
(b) when 100 parts by weight of the granule is cleaned with 100 parts by weight of MeOH, the total amount of oleic amide, erucic amide and stearic amide eluted into the cleaning liquid of MeOH is 1 to 50 ppb based on the granule.

The molded article is preferably an optical lens. The molded article is also preferably a spectacle lens.

BEST MODE FOR CARRYING OUT THE INVENTION

The present invention will be described in detail hereinunder.
<Method of Manufacturing a Molded Article>
(Polycarbonate Resin)

The granule used in the present invention is composed of a polycarbonate resin. The polycarbonate resin (to be simply referred to as "polycarbonate" hereinafter) is obtained by reacting a diphenol with a carbonate precursor. Examples of the reaction include interfacial polycondensation, melt ester interchange, the solid-phase ester interchange of a carbonate prepolymer and the ring opening polymerization of a cyclic carbonate compound.

Examples of the diphenol include hydroquinone, resorcinol, 4,4'-biphenol, 1,1-bis(4-hydroxyphenyl)ethane, 2,2-bis(4-hydroxyphenyl)propane (commonly known as "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyophenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methylphenyl)sulfide, 9,9-bis(4-hydroxyphenyl)fluorene and 9,9-bis(4-hydroxy-3-methylphenyl)fluorene. A polycarbonate comprising a bis(4-hydroxyphenyl)alkane, especially bisphenol A (may be abbreviated as "BPA" hereinafter) out of these diphenols as the main component is particularly preferred. The content of BPA is preferably 90 mol % or more, more preferably 95 mol or more, particularly preferably 100 mol % or more.

In the present invention, special polycarbonates manufactured by using other diphenols may be used as the component A, besides polycarbonates which comprise bisphenol A as the main component.

For example, polycarbonates (homopolymers or copolymers) obtained from 4,4'-(m-phenylenediisopropylidene) diphenol (may be abbreviated as "BPM" hereinafter), 1,1-bis (4-hydroxyphenyl)cyclohexane, 1,1-bis(4-hydroxyphenyl)-3,3,5-trimethylcyclohexane (may be abbreviated as "Bis-TMC" hereinafter), 9,9-bis(4-hydroxyphenyl) fluorene and 9,9-bis(4-hydroxy-3-methylphenyl) fluorene (may be abbreviated as "BCF" hereinafter) as part or all of the diphenol component are suitable for use in application fields in which the requirements for dimensional change by water absorption and form stability are very strict. These diphenols other than BPA are used in an amount of preferably 5 mol % or more, particularly preferably 10 mol % or more of the whole diphenol component constituting the polycarbonate.

The carbonate precursor is a carbonyl halide, carbonate ester or haloformate, as exemplified by phosgene, diphenyl carbonate and dihaloformates of a diphenol.

For the manufacture of a polycarbonate resin from a diphenol and a carbonate precursor by interfacial polymerization, a catalyst, a terminal capping agent and an antioxidant for preventing the oxidation of the diphenol may be optionally used. The polycarbonate may be a branched polycarbonate obtained by copolymerizing a polyfunctional aromatic compound having 3 or more functional groups. Examples of the polyfunctional aromatic compound having 3 or more functional groups used in the branched polycarbonate include 1,1,1-tris(4-hydroxyphenyl) ethane and 1,1,1-tris(3,5-dimethyl-4-hydroxyphenyl) ethane.

The polycarbonate may also be a polyester carbonate obtained by copolymerizing an aromatic or aliphatic (including alicyclic) bifunctional carboxylic acid, a copolycarbonate obtained by copolymerizing a bifunctional alcohol (including an alicyclic alcohol), or a polyester carbonate obtained by copolymerizing the bifunctional carboxylic acid and the bifunctional alcohol. It may also be a mixture of two or more obtained polycarbonates.

The polymerization reaction of the polycarbonate by interfacial polycondensation is generally a reaction between a diphenol and phosgene which is carried out in the presence of an acid binder and an organic solvent. The acid binder is preferably an alkali metal hydroxide such as sodium hydroxide or potassium hydroxide, or an amine compound such as pyridine. The organic solvent is preferably a halogenated hydrocarbon such as methylene chloride or chlorobenzene. To promote the reaction, a catalyst such as a tertiary amine, quaternary ammonium compound or quaternary phosphonium compound exemplified by triethylamine, tetra-n-butylammonium bromide and tetra-n-butylphosphonium bromide may be used. The reaction temperature is generally 0 to 40° C., the reaction time is about 10 minutes to 5 hours, and pH during the reaction is preferably maintained at 9 or more.

In the polymerization reaction, a terminal capping agent is generally used. A monofunctional phenol may be used as the terminal capping agent. Preferred examples of the monofunctional phenol include phenol, p-tert-butylphenol and p-cumylphenol.

The organic solvent solution of the polycarbonate resin obtained by interfacial polycondensation is generally rinsed with water. This rinsing step is preferably carried out by using water having electric conductivity of preferably 10 µS/cm or less, more preferably 1 µS/cm or less, such as ion exchange water. The above organic solvent solution and water are mixed together, stirred and divided into an organic solvent solution phase and a water phase by still standing or using a centrifugal separator to extract the organic solvent solution phase repeatedly so as to remove water-soluble impurities. The water-soluble impurities are removed efficiently by rinsing with high-purity water, whereby the color of the obtained polycarbonate resin becomes good.

It is also preferred that the organic solvent solution of the polycarbonate resin should be rinsed with an acid or alkali to remove impurities such as the catalyst.

It is preferred that foreign matter which is an insoluble impurity should be removed from the organic solvent solution. To remove the foreign matter, filtration or centrifugation is preferably employed.

The solvent is then removed from the organic solvent solution which has been rinsed with water to carry out the operation of obtaining a granule of the polycarbonate resin.

Since the method of obtaining the granule (granulating step) is simple in operation and post-treatment, the solvent is evaporated by supplying the organic solvent solution of the polycarbonate continuously under agitation into a granulator where the granule and hot water (about 65 to 90° C.) are existent to produce slurry. A mixer such as an agitation tank or kneader is used as the granulator. The formed slurry is discharged from the upper part or lower part of the granulator.

The discharged slurry may be subjected to a hydrothermal treatment. In the hydrothermal treatment step, the organic solvent contained in the slurry is removed by supplying the slurry into a hot water container filled with 90 to 100° C. hot water or setting the temperature of water to 90 to 100° C. by blowing vapor after the slurry is supplied.

Water and the organic solvent are then removed from the slurry discharged from the granulating step or the slurry after the hydrothermal treatment preferably by filtration or centrifugation, and the slurry is dried to obtain a granule (powder or flake).

The drier may be of conduction heating system or hot air heating system, and the granule may be left to stand, transferred or stirred. A groove type or cylindrical drier which employs conduction heating system to stir the granule is preferred, and a groove type drier is particularly preferred. The drying temperature is preferably in the range of 130 to 150° C.

The granule obtained after drying can be pelletized by a melt extruder. This pellet is to be molded.

The melt ester interchange reaction is generally an ester interchange reaction between a diphenol and a carbonate ester. This reaction is carried out by mixing together the diphenol and the carbonate ester under heating in the presence of an inert gas and distilling off the formed alcohol or phenol. The reaction temperature which differs according to the boiling point of the formed alcohol or phenol is 120 to 350° C. in most cases. The inside pressure of the reaction system is reduced to $1.33 \times 10^3$ to 13.3 Pa in the latter stage of the reaction to facilitate the distillation-off of the formed alcohol or phenol. The reaction time is generally about 1 to 4 hours.

Examples of the carbonate ester include ester of aryl groups and aralkyl groups having 6 to 10 carbon atoms which may have a substituent, and alkyl groups having 1 to 4 carbon atoms. Out of these, diphenyl carbonate is particularly preferred.

The molten polycarbonate resin obtained by the melt ester interchange can be pelletized by a melt extruder. This pellet is to be molded.

The viscosity average molecular weight of the polycarbonate resin is preferably $1.0 \times 10^4$ to $5.0 \times 10^4$, more preferably $1.2 \times 10^4$ to $3.0 \times 10^4$, much more preferably $1.5 \times 10^4$ to $2.8 \times$ $10^4$. When the viscosity average molecular weight is lower than $1.0\times10^4$, strength lowers and when the viscosity average molecular weight is higher than $5.0\times10^4$, moldability degrades. In this case, it is possible to mix a polycarbonate having a viscosity average molecular weight outside the above range as long as moldability is maintained. For example, it is possible to mix a polycarbonate component having a viscosity average molecular weight higher than $5.0\times10^4$.

The viscosity average molecular weight M is calculated based on the following equation from the specific viscosity ($\eta sp$) of a solution containing 0.7 g of the polycarbonate resin dissolved in 100 ml of methylene chloride at 20° C. which is obtained with an Ostwald viscometer based on the following equation.

Specific viscosity($\eta sp$)=$(t-t_0)/t_0$

[$t_0$ is a time (seconds) required for the dropping of methylene chloride and t is a time (seconds) required for the dropping of a sample solution]

$\eta_{sp}/c=[\eta]+0.45\times[\eta]^2 c$ ([$\eta$] represents an intrinsic viscosity)

$[\eta]=1.23\times10^{-4} M^{0.83}$ $c=0.7$

The measurement of the viscosity average molecular weight of the granule can be carried out as follows. That is, the granule is dissolved in methylene chloride in a weight ratio of 1:20 to 1:30, soluble matter is collected by cerite filtration, the solvent contained in the soluble matter is removed, and the soluble matter is dried completely so as to obtain methylene chloride-soluble solid. 0.7 g of the solid is dissolved in 100 ml of methylene chloride to measure the specific viscosity ($\eta sp$) of the obtained solution at 20° C. with an Ostwald viscometer so as to calculate its viscosity average molecular weight M from the above equation.

The granule may be in the form of a powder, pellet or flake. The shape of the pellet may be an ordinary shape such as columnar, square pillar-like or spherical shape but preferably a columnar shape. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

The present invention is characterized in that the amount of an Fe compound or the total amount of amide compounds adhered to the surface of the granule when it is stored, blended or transported after its manufacture is reduced to a predetermined value or less. By reducing the amount of the Fe compound or the total amount of the amide compounds adhered to the surface during molding to a predetermined value or less, a molded article having excellent heat stability, color and transparency can be obtained.

(Fe Compound)

In the Present Invention, the Granule Satisfies the following condition (a). That is, (a) when 100 parts by weight of the granule is cleaned with 100 parts by weight of a 1N nitric acid aqueous solution, the amount of an Fe compound eluted into the cleaning liquid of the 1N nitric acid aqueous solution is 1 to 100 ppb in terms of an Fe atom based on the granule.

The amount of the Fe compound is 1 to 100 ppb, preferably 1 to 50 ppb, more preferably 1 to 40 ppb, much more preferably 1 to 25 ppb, particularly preferably 1 to 10 ppb in terms of the Fe atom based on the granule. When the amount of the Fe compound in terms of the Fe atom is larger than 100 ppb, the heat resistance lowers and the color of a molded article obtained by melt molding the granule tends to become worse. Particularly when amide compounds exist, the worsening of the color tends to become marked disadvantageously.

The amount of the Fe compound can be measured by the following method. That is, a quartz glass conical flask and a quartz glass bar are cleaned with a 1N nitric acid aqueous solution in advance, and it is confirmed that the amount of an Fe component in the cleaning liquid of the 1N nitric acid aqueous solution is 0.1 ppb or less. 100 parts by weight of the granule is then put into the confirmed conical flask, and 100 parts by weight of the 1N nitric acid aqueous solution is added to the flask, stirred with the confirmed glass bar for 1 minute, left to stand for 2 hours, stirred again for 1 minute and then left to stand to determine the amount of Fe by the ICP emission spectrometry of a liquid phase portion.

The amount of the Fe compound on the surface of the granule increases by contact between the granule and a tank, container or pipe having a material such as stainless steel (SUS) containing Fe on the inner wall. An increase in the amount of the Fe compound adhered to the surface of the granule becomes significant due to the corrosion of part of the inside of the tank, container or pipe or the cracking of an inner welded portion.

The amount of the Fe compound adhered to the surface of the granule can be reduced by cleaning the granule with a nitric acid aqueous solution.

It is preferred that the granule should be stored or blended by using a storage tank or blend tank whose inner wall has been passivated. In this case, the amount of the Fe compound on the surface of a granule stored in the tank is measured on a regular basis so that a granule having a predetermined amount or more of the Fe compound adhered thereto is not used in the manufacture of a molded article which requires a good color and transparency. A granule having a predetermined amount or more of the Fe compound adhered thereto may be mixed with a granule having a small amount of the Fe compound adhered thereto before molding. The granule to be molded in the present invention is characterized in that the amount of the Fe compound adhered to the surface of the granule falls within a predetermined range.

The present invention is a method of manufacturing a molded article by melting and molding a granule of a polycarbonate resin stored in the tank at a temperature of 280 to 380° C., wherein the granule is molded after it is confirmed that the granule satisfies the above condition (a).

(Amide Compounds)

The present invention is based on the finding that when the granule is put into a bag having a polyethylene film containing amide compounds as additives on the inner surface and transported, the amide compounds adhere to the surface of the granule and a molded article obtained by melt molding the granule is colored.

In the present invention, the granule preferably satisfies the following condition (b) in addition to the above condition (a).

(b) When 100 parts by weight of the granule is cleaned with 100 parts by weight of MeOH, the total amount of oleic amide, erucic amide and stearic amide eluted into the cleaning liquid of MeOH is 1 to 50 ppb based on the granule. The oleic amide, erucic amide and stearic amide may be collectively referred to as "amide compounds" hereinafter.

The total amount of the amide compounds is preferably 1 to 40 ppb, more preferably 1 to 25 ppb, much more preferably 1 to 10 ppb based on the granule. When the total amount of the amide compounds is larger than 50 ppb, the heat resistance lowers, the color of a molded article obtained by melt molding the granule tends to become worse, and the worsening of the color tends to become marked particularly when the Fe compound is existent.

The total amount of the amide compounds adhered to the surface of the granule can be measured by the following method. That is, a quartz glass conical flask and a quartz glass bar are cleaned with MeOH in advance, it is confirmed that the total amount of amide compounds in the cleaning liquid of MeOH is 0.1 ppb or less, 100 parts by weight of the granule is put into the confirmed quartz glass conical flask, and 100 parts by weight of MeOH is added, stirred with the quartz glass bar for 1 minute, left to stand for 2 hours, stirred again for 1 minute and then left to stand to determine the total amount of the amide compounds by the GC/MS of a liquid phase portion.

The total amount of the amide compounds increases by contact between the granule and a paper bag having a polyethylene film containing the amide compounds as additives on the inner surface. Particularly when the granule is put into the paper bag having a polyethylene film on the inner surface and transported, the polyethylene film may be broken by vibration and an increase in the total amount of the amide compounds adhered to the surface of the granule becomes significant.

The total amount of the amide compounds adhered to the surface of the granule can be reduced by cleaning the granule with MeOH. The total amount of the amide compounds can also be reduced by using a bag having no polymer film containing amide compounds as additives on the inner surface.

It is preferred that the amount of the Fe compound and the total amount of the amide compounds adhered to the surface of the granule should satisfy the above ranges.

(Molding)

The granule of the present invention is molten and molded at a temperature of 280 to 380° C. Molding may be injection molding, compression molding, extrusion compression molding, rotational molding, blow molding or sheet extrusion.

Examples of the molded article include optical lenses such as spectacle lenses, camera lenses, binocular lenses, microscope lenses, projector lenses, Fresnel lenses, lenticular lenses, fθ lenses, head lamp lenses and pick-up lenses, window glasses for automobiles, roofs, head lamp covers, buttons for mobile phones, and sheets such as retardation films, polarizing plates, light diffusion plates, face plates (protective covers for meters), helmet shields and wind-proof plates for bicycles.

The manufacturing method of the present invention is advantageously used to mold optical lenses, especially spectacle lenses because a molded article having excellent heat resistance, color and total light transmittance (transparency) can be obtained.

According to the present invention, a molded article having a color (YI value) of preferably 0.3 to 3.0, more preferably 0.5 to 2.0 when a 5 mm-thick flat plate is measured by a transparency method in accordance with ASTM D1925 can be obtained. According to the present invention, a molded article having a total light transmittance of preferably 90% or more when a 2 mm-thick flat plate is measured in accordance with ISO13468 can be obtained.

(Coloration Preventing Method)

The present invention is a method of preventing the coloration of a molded article when a granule of a polycarbonate resin is molded, wherein the granule satisfies the above condition (a).

The granule preferably satisfies the above condition (b) in addition to the condition (a). The molded article is preferably an optical lens, especially a spectacle lens.

(Additives)

A release agent, heat stabilizer, ultraviolet absorber, bluing agent, antistatic agent, flame retardant, heat ray screening agent, fluorescent dye (including fluorescent brightening agent), pigment, light diffuser, reinforcing filler, other resin and elastomer may be contained in the granule in limits not prejudicial to the object of the present invention.

Preferably, the release agent comprises 90 wt % or more of an ester of an alcohol and a fatty acid. The ester of an alcohol and a fatty acid is, for example, an ester of a monohydric alcohol and a fatty acid and/or a partial or whole ester of a polyhydric alcohol and a fatty acid. The ester of a monohydric alcohol and a fatty acid is preferably an ester of a monohydric alcohol having 1 to 20 carbon atoms and a saturated fatty acid having 10 to 30 carbon atoms. The partial or whole ester of a polyhydric alcohol and a fatty acid is preferably a partial or whole ester of a polyhydric alcohol having 1 to 25 carbon atoms and a saturated fatty acid having 10 to 30 carbon atoms.

Examples of the ester of a monohydric alcohol and a saturated fatty acid include stearyl stearate, palmityl palmitate, butyl stearate, methyl laurate and isopropyl palmitate, out of which stearyl stearate is preferred.

Examples of the partial or whole ester of a polyhydric alcohol and a saturated fatty acid include monoglyceride stearate, diglyceride stearate, triglyceride stearate, monosorbitate stearate, monoglyceride behenate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritol hexastearate.

Out of these esters, monoglyceride stearate, triglyceride stearate, pentaerythritol tetrastearate and a mixture of triglyceride stearate and stearyl stearate are preferred.

The content of the above ester in the release agent is 90 wt % or more, more preferably 95 wt % or more based on 100 wt % of the release agent.

The content of the release agent in the granule is 0.005 to 2.0 parts by weight, more preferably 0.01 to 0.6 part by weight, much more preferably 0.02 to 0.5 part by weight based on 100 parts by weight of the granule.

The heat stabilizer is selected from a phosphorus-based heat stabilizer, sulfur-based heat stabilizer and hindered phenol-based heat stabilizer.

The phosphorus-based heat stabilizer is a phosphorous acid, phosphoric acid, phosphonous acid, phosphonic acid or ester thereof, as exemplified by triphenyl phosphite, tris(nonylphenyl)phosphite, tris(2,4-di-tert-butylphenyl)phosphite, tris(2,6-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerithritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite.

Out of these, tris(2,4-di-tert-butylphenyl)phosphite, tris(2,6-di-tert-butylphenyl)phosphite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite are preferred, and tetrakis(2,4-di-tert-butylphenyl)-4,4'-biphenylene diphosphonite is particularly preferred. The content of the phosphorus-based heat stabilizer in the granule is preferably 0.001 to 0.2 part by weight based on 100 parts by weight of the granule.

Examples of the sulfur-based heat stabilizer include pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate and distearyl-3,3'-thiodipropionate, out of which pentaerythritol-tetrakis(3-laurylthiopropionate), pentaerythritol-tetrakis(3-myristylthiopropionate), dilauryl-3,3'-thiodipropionate and dimyristyl-3,3'-thiodipropionate are preferred. Pentaerythritol-tetrakis(3-laurylthiopropionate) is particularly preferred. The thioether-based compounds are commercially available from Sumitomo Chemical Co., Ltd. under the trade names of Sumirizer TP-D and Sumirizer TPM and can be easily used. The content of the sulfur-based heat stabilizer in the granule is preferably 0.001 to 0.2 part by weight based on 100 parts by weight of the granule.

Examples of the hindered phenol-based heat stabilizer include triethylene glycol-bis[3-(3-tert-butyl-5-methyl-4-hydroxyphenyl) propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl)propionate], octadecyl-3-(3,5-di-tert-butyl-4-hydroxyphenyl) propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamide), 3,5-di-tert-butyl-4-hydroxy-benzylphosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy]ethyl}-2,4,8,10-tetraoxaspiro (5,5)undecane, out of which octadecyl-3-(3,5-di-tert-butyl-4-hydroxyphenyl) propionate is particularly preferred. The content of the hindered phenol-based heat stabilizer in the granule is preferably 0.001 to 0.1 part by weight based on 100 parts by weight of the granule.

The ultraviolet light absorber is preferably at least one ultraviolet absorber selected from the group consisting of a benzotriazole-based ultraviolet absorber, benzophenone-based ultraviolet absorber, triazine-based ultraviolet absorber, cyclic iminoester-based ultraviolet absorber and cyanoacrylate-based ultraviolet absorber. Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl]benzotriazole. They may be used alone or in combination of two or more.

2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol] and 2-[2-hydroxy-3-(3,4,5,6-tetrahydrophthalimidomethyl)-5-methylphenyl]benzotriazole are preferred, and 2-(2-hydroxy-5-tert-octylphenyl)benzotriazole and 2,2'-methylenebis[4-(1,1,3,3-tetramethylbutyl)-6-(2H-benzotriazol-2-yl)phenol] are more preferred.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Examples of the triazine-based ultraviolet absorber include 2-(4,6-diphenyl-1,3,5-triazin-2-yl)-5-[(hexyl)oxy]-phenol, and 2-(4,6-bis(2,4-dimethylphenyl)-1,3,5-triazin-2-yl)-5-[(octyl)oxy]-phenol.

Examples of the cyclic iminoester-based ultraviolet absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one, 2,2'-(2-methyl-p-phenylene)bis(3,1-benzoxazin-4-one), 2,2'-(2-nitro-p-phenylene)bis(3,1-benzoxazin-4-one) and 2,2'-(2-chloro-p-phenylene)bis(3,1-benzoxazin-4-one). Out of these, 2,2'-p-phenylenebis(3,1-benzoxazin-4-one), 2,2'-(4,4'-diphenylene)bis(3,1-benzoxazin-4-one) and 2,2'-(2,6-naphthalene)bis(3,1-benzoxazin-4-one) are preferred, and 2,2'-p-phenylenebis(3,1-benzoxazin-4-one) is particularly preferred. The compound is commercially available from Takemoto Yushi Co., Ltd. under the trade name of CEi-P and can be easily used.

Examples of the cyanoacrylate-based ultraviolet absorber include 1,3-bis[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene. The amount of the ultraviolet absorber is preferably 0.01 to 3.0 parts by weight, more preferably 0.02 to 1.0 part by weight, much more preferably 0.05 to 0.8 part by weight based on 100 parts by weight of the granule. Within the above range, sufficiently high weatherability can be provided to a polycarbonate resin molded article according to application purpose.

Examples of the bluing agent include the Macrolex Violet B and Macrolex Blue RR of Bayer Co., Ltd. and the Polysynthrene Blue RLS of Clariant Co., Ltd. The bluing agent is effective in erasing the yellow tinge of the granule. Since a granule provided with weatherability contains a predetermined amount of an ultraviolet absorber, a molded article of the polycarbonate resin is apt to be tinged with yellow according to "the function and color of the ultraviolet absorber". To provide natural transparency to a sheet or lens in particular, use of the bluing agent is very effective.

The amount of the bluing agent is preferably 0.05 to 1.5 ppm, more preferably 0.1 to 1.2 ppm based on the granule.

EXAMPLES

The following examples are provided to further illustrate the present invention. "Parts" means parts by weight and evaluations were made by the following methods.

(1) Method of Determining the Amount of a Fe Compound on the Surface of a Pellet A 300 ml quartz glass conical flask and a quartz glass bar were cleaned with 100 ml of a 1N nitric acid aqueous solution in advance, and it was confirmed that the content of a Fe component in the cleaning liquid of the 1N nitric acid aqueous solution was 0.1 ppb or less. The quartz glass conical flask was made empty, 100 g of the pellet was put into the flask, and 100 g of the 1N nitric acid aqueous solution was added and stirred with the quartz glass bar for 1 minute. The solution was left to stand for 2 hours, stirred again for 1 minute and left to stand to determine the content of the Fe atom in a liquid phase portion by ICP emission spectrometry and express the weight of the Fe atom in the Fe compound eluted into the cleaning liquid of the 1N nitric acid aqueous solution as a concentration (ppb) based on the weight of the pellet.

(2) Method of Determining the Total Amount of Amide Compounds (Oleic Amide, Erucic Amide and Stearic Amide) on the Surface of a Pellet A 300 ml quartz glass conical flask and a quartz glass bar were cleaned with 100 ml of MeOH in advance, and it was confirmed that the total content of amide compounds in the cleaning liquid of MeOH was 0.1 ppb or less. The quartz glass conical flask was made empty, 100 g of the pellet was put into the flask, and 100 g of MeOH was added and stirred with the quartz glass bar for 1 minute. The MeOH was left to stand for 2 hours, stirred again for 1 minute and left to stand to determine the total content of the amide compounds in a liquid phase portion by GC/MS and express the total weight of the amide compounds eluted into the cleaning liquid of MeOH as a concentration (ppb) based on the weight of the pellet.

(3) Color (YI Value)

After the pellet was dried at 120° C. for 5 hours, it was molded into a flat plate having a length of 70 mm, a width of 50 mm and a thickness of 5 mm by an injection molding machine at a cylinder temperature of 300° C. and a mold temperature of 105° C. The color (YI value) of this 5 mm-thick flat plate was measured by using the Color-Eye 7000A of Grater Macbeth Co., Ltd. and a C light source at a view angle of 2° in accordance with a transmission method based on ASTM D1925. Although the YI value changes by the amount of an additive, when the amount of the additive is the same, discoloration at the time of molding becomes less and heat resistance becomes higher as the YI value becomes smaller.

(4) Total Light Transmittance

After the pellet was dried at 120° C. for 5 hours, it was molded into a flat plate having a length of 90 mm, a width of 50 mm and a thickness of 2 mm by an injection molding machine at a cylinder temperature of 350° C. and a mold temperature of 80° C. The total transmittance of this 2 mm-thick flat plate was measured by the NDH-2000 of Nippon Denshoku Co., Ltd. in accordance with ISO13468.

Example 1

Manufacture of Pellets

The polycarbonate resin powder and the additives shown in Table 1 were mixed together (composition A) in the ratio shown in Table 1 and the resulting mixture was melt extruded with a double-screw extruder by using production equipment for the manufacture of a polycarbonate resin pellet to obtain 36 tons of pellets.

(Blending and Storage of Pellets)

The obtained pellets were blended in a stainless steel (SUS) blend tank for 8 hours and transferred to an SUS product tank. The blend tank, product tank and peripheral equipment whose insides were cleaned 1 month or less ago were used. As for cleaning work, the insides of the tanks were cleaned by circulating a 20% nitric acid aqueous solution and a surfactant for 5 hours and further rinsed with pure water, and then compressed air was blown into the tanks to dry them.

(Bagging and Transportation of Pellets)

The pellets in the product tank were put into a paper bag having a capacity of 25 kg and a polyethylene film on the inner surface over 6.5 hours.

20 paper bags of the pellets were chosen from the above paper bags and transported from Japan to the warehouse in the U.S. as test pellets. 500 kg (20 bags, each containing 25 kg of the pellets) of the pellets transported to the warehouse in the U.S. was blended by a twin-cylinder mixer for 5 minutes to prepare pellets (1). Some of the pellets (1) were transferred to a glass bottle, and the bottle was sealed up and returned to Japan. The total amount of amide compounds adhered to the surface of each pellet when the pellets contained in the bags having a polyethylene film on the inner surface were transported to the U.S. was measured. When they were returned to Japan in the glass bottle, no adhesion of the amide compounds was seen.

The amounts of the Fe compound and the amide compounds adhered to the surface of each pellet (1) returned to Japan were measured. The color (YI value) and total light transmittance of a molded article obtained by molding the pellet (1) were measured. The characteristic properties of the pellet (1) and the characteristic properties of a molded article obtained from the pellet (1) are shown in Table 2.

Example 2

A pellet (2) was obtained in the same manner as in Example 1 except that a blend tank, product tank and peripheral equipment which were cleaned 1 year ago were used. The characteristic properties of the pellet (2) and the characteristic properties of a molded article obtained from the pellet (2) are shown in Table 2.

Comparative Example 1

A pellet (C1) was obtained in the same manner as in Example 1 except that a blend tank, product tank and peripheral equipment which were cleaned 3 years ago were used. The characteristic properties of the pellet (C1) and the characteristic properties of a molded article obtained from the pellet (C1) are shown in Table 2.

Manufacturing Example A 10 kg of the pellet (1) transported to the U.S. in Example 1 was dispensed into a 50-liter SUS container provided with a stirring machine having anchor type agitation blades, and 10 kg of MeOH was added, stirred for 5 minutes and filtered with an SUS net having an opening size of 1 mm. The pellet was rinsed with 5 kg of MeOH on the SUS net. This rinsing operation was further carried out twice, and the pellet was dried at 50° C. and 133 Pa for 12 hours by using a vacuum drier to obtain a pellet (1A). The pellet (1A) was put into a glass container, and the container was sealed up and returned to Japan. The amounts of the Fe compound and the amide compounds adhered to the surface of the pellet (1A) were measured by the above methods. As a result, the amount of the Fe compound on the surface of the pellet (1A) was smaller than 0.1 ppb and the total amount of the amide compounds was smaller than 0.1 ppb.

Example 3

The pellet (C1) of Comparative Example 1 and the pellet (1A) of the Manufacturing Example A were mixed together in a ratio of 5:95 by a blender to prepare a pellet (3). The characteristic properties of the pellet (3) and the characteristic properties of a molded article obtained from the pellet (3) are shown in Table 2.

Example 4

The pellet (C1) of Comparative Example 1 and the pellet (1A) of the Manufacturing Example A were mixed together in a ratio of 40:60 by a blender to prepare a pellet (4). The characteristic properties of the pellet (4) and the characteristic properties of a molded article obtained from the pellet (4) are shown in Table 2.

Example 5

The pellet (1) of Example 1 and the pellet (1A) of the Manufacturing Example A were mixed together in a ratio of 50:50 by a blender to prepare a pellet (5). The characteristic properties of the pellet (5) and the characteristic properties of a molded article obtained from the pellet (5) are shown in Table 2.

Manufacturing Example B

A pellet (1B) was obtained in the same manner as in Example 1 except that a blend tank, product tank and peripheral equipment which were cleaned 3 years ago were used, and 150 kg of the pellet was put into a 200-liter SUS container in place of a paper bag.
The pellet (1B) was not transported to the U.S. As a result, the amount of the Fe compound on the surface of the pellet (1B) was 96 ppb and the total amount of the amide compounds was smaller than 0.1 ppb.

Example 6

The pellet (C1) of Comparative Example 1 and the pellet (1B) of the Manufacturing Example B were mixed together in a ratio of 5:95 by a blender to prepare a pellet (6). The characteristic properties of the pellet (6) and the characteristic properties of a molded article obtained from the pellet (6) are shown in Table 2.

Example 7

A pellet (7) was obtained in the same manner as in Example 1 except that a polycarbonate resin composition having composition B in place of composition A in Table 1 was used. The characteristic properties of the pellet (7) and the characteristic properties of a molded article obtained from the pellet (7) are shown in Table 2.

Example 8

A pellet (8) was obtained in the same manner as in Example 7 except that a blend tank, product tank and peripheral equipment which were cleaned 1 year ago were used. The characteristic properties of the pellet (8) and the characteristic properties of a molded article obtained from the pellet (8) are shown in Table 2.

Comparative Example 2

A pellet (C2) was obtained in the same manner as in Example 7 except that a blend tank, product tank and peripheral equipment which were cleaned 3 years ago were used. The characteristic properties of the pellet (C2) and the characteristic properties of a molded article obtained from the pellet (C2) are shown in Table 2.

Manufacturing Example C 10 kg of the pellet (7) transported to the U.S. in Example 7 and blended by a twin-cylinder mixer was dispensed into a 50-liter SUS container provided with a stirring machine having anchor type agitation blades, and 10 kg of MeOH was added, stirred for 5 minutes and filtered with an SUS net having an opening size of 1 mm. The obtained pellet was rinsed with 5 kg of MeOH on the SUS net. This rinsing operation was further carried out twice, and the pellet was dried at 50° C. and 133 Pa for 12 hours by using a vacuum drier to obtain a pellet (7C). The dried pellet (7C) was put into a glass container, and the container was sealed up and returned to Japan. The amount of the Fe compound and the total amount of the amide compounds adhered to the surface of the pellet (7C) were measured. As a result, the amount of the Fe compound on the surface of the pellet (7C) was smaller than 0.1 ppb and the total amount of the amide compounds was smaller than 0.1 ppb.

Example 9

The pellet (C2) of Comparative Example 2 and the pellet (7C) of the Manufacturing Example C were mixed together in a ratio of 5:95 by a blender to prepare a pellet (9). The characteristic properties of the pellet (9) and the characteristic properties of a molded article obtained from the pellet (9) are shown in Table 2.

Example 10

The pellet (C2) of Comparative Example 2 and the pellet (7C) of the Manufacturing Example C were mixed together in a ratio of 40:60 by a blender to prepare a pellet (10). The characteristic properties of the pellet (10) and the characteristic properties of a molded article obtained from the pellet (10) are shown in Table 2.

Example 11

The pellet (7) of Example 7 and the pellet (7C) of the Manufacturing Example C were mixed together in a ratio of 50:50 by a blender to prepare a pellet (11). The characteristic properties of the pellet (11) and the characteristic properties of a molded article obtained from the pellet (11) are shown in Table 2.

Manufacturing Example D

A pellet (7D) was obtained in the same manner as in Example 7 except that a blend tank, product tank and peripheral equipment which were cleaned 3 years ago were used, and 150 kg of the pellet was put into a 200-liter SUS container in place of a paper bag. The pellet (7D) was not transported to the U.S. The amount of the Fe compound and the total amount of the amide compounds adhered to the surface of the pellet (7D) were measured. As a result, the amount of the Fe compound on the surface of the pellet (7D) was 92 ppb and the total amount of the amide compounds was smaller than 0.1 ppb.

Example 12

The pellet (C2) of Comparative Example 2 and the pellet (7D) of the Manufacturing Example D were mixed together in a ratio of 5:95 by a blender to prepare a pellet (12). The characteristic properties of the pellet (12) and the characteristic properties of a molded article obtained from the pellet (12) are shown in Table 2.

Example 13

The injection compression molding of convex lenses for spectacles having the following specifications was carried out by using the pellets of Examples 1 to 6 as raw materials and setting a core compression mold in the injection molding machine (SYCAPSG220) of Sumitomo Heavy Industries, Ltd. The obtained polycarbonate resin negative spectacle lenses (convex lenses) had excellent transparency, and dullness was not seen in the lenses.
Radius of curvature on the front side: 293.00 mm
Radius of curvature on the rear side: −73.25 mm
Center thickness: 1.5 mm
Edge thickness: 10.0 mm
Lens outer diameter: 77.5 mm
Focal distance of apex on the rear side: −166.67 mm
The main molding conditions were given below.
Cylinder temperature: 280 to 300° C.
Mold temperature: 125° C.
Molding cycle: 240 seconds
The following polycarbonate resins, ultraviolet absorbers, heat stabilizers, release agents and bluing agents in Table 1 were used.

(Polycarbonate Resin)
PC-1: polycarbonate resin powder having a viscosity average molecular weight of 23,900 manufactured from bisphenol A and phosgene by interfacial polymerization (Panlite (registered trademark) L-1250WP of Teijin Chemicals, Ltd.)
PC-2: polycarbonate resin powder having a viscosity average molecular weight of 22,400 manufactured from bisphenol A and phosgene by interfacial polymerization (Panlite (registered trademark) L-1225WP (trade name) of Teijin Chemicals, Ltd.)
(Ultraviolet Absorber)
UVA-1: 2-(2'-hydroxy-5'-tert-octylphenyl)benzotriazole (Chemisorb 79 (trade name) of Chemipro Kasei Co., Ltd.)
UVA-2: 2-(3-tert-butyl-5-methyl-2-hydroxyphenyl)-5-chlorobenzo triazole (Tinubin 326 (trade name) of Ciba Specialty Chemicals Co., Ltd.)
(Heat Stabilizer)
HS-1: a mixture of the following components P-1, P-2 and P-3 in a weight ratio of 71:15:14 (Sandstab P-EPQ (trade name) of Clariant Japan Co., Ltd.)
Component P-1: a mixture of tetrakis(2,4-di-tert-butylphenyl)-4,4'-biphenylene diphosphonite, tetrakis(2,4-di-tert-butylphenyl)-4,3'-biphenylene diphosphonite and tetrakis(2,4-di-tert-butylphenyl)-3,3'-biphenylene diphosphonite in a weight ratio of 100:50:10
Component P-2: a mixture of bis(2,4-di-tert-butylphenyl)-4-phenyl-phenyl phosphonite and bis(2,4-di-tert-butylphenyl)-3-phenyl-phenyl phosphonite in a weight ratio of 5:3
Component P-3: tris(2,4-di-tert-butylphenyl)phosphite
(Release Agent)
MR-1: a mixture of triglyceride stearate and stearyl stearate (Rikemal SL-900 (trade name) of Riken Vitamin Co., Ltd.)
MR-2: monoglyceride stearate (Rikemal S-100A (trade name) of Riken Vitamin Co., Ltd.)
(Bluing Agent)
BR-1: anthraquinone-based compound (Microlex Violet B (trade name) of Bayer AG)

TABLE 1

| Composition | Raw material PC Type | Raw material PC Amount (Parts) | Ultraviolet absorber Type | Ultraviolet absorber Amount (Parts) | Heat stabilizer Type | Heat stabilizer Amount (Parts) | Release agent Type | Release agent Amount (Parts) | Bluing agent (BR-1) Amount (Parts) |
|---|---|---|---|---|---|---|---|---|---|
| A | PC-1 | 100 | UVA-1 | 0.30 | HS-1 | 0.03 | MR-1 | 0.25 | 0.000060 |
|   |      |     | UVA-2 | 0.04 |      |      |      |      |          |
| B | PC-2 | 100 | —     | —    | HS-1 | 0.03 | MR-2 | 0.10 | 0.000035 |

PC-1: L-1250WP,
PC-2: L-1225WP,
UVA-1: U2agent,
UVA-2: U4agent,
HS-1: A5agent,
MR-1: L2agent,
MR-2: L1agent,
BR-1: H1agent

TABLE 2

| | Composition | Fe (ppb) | Aamide compounds (ppb) | | | | YI | Color of molded plate (thickness of 5 mm) Visual inspection Existence of dullness | Molded plate (thickness of 2 mm) Total light transmittance % |
| | | | Erucic amide | Oleic amide | Stearic amide | Total | | | |
|---|---|---|---|---|---|---|---|---|---|
| Ex. 1 | A | 3 | 70 | 31 | 14 | 115 | 1.45 | Not seen | 90 |
| Ex. 2 | A | 27 | 58 | 25 | 7 | 90 | 1.49 | Not seen | 90 |
| Ex. 3 | A | 5 | 4 | 1 | <0.1 | 5 | 1.43 | Not seen | 90 |
| Ex. 4 | A | 38 | 21 | 13 | 3 | 37 | 1.48 | Not seen | 90 |
| Ex. 5 | A | 1 | 39 | 14 | 4 | 57 | 1.45 | Not seen | 90 |
| Ex. 6 | A | 96 | 4 | 1 | <0.1 | 5 | 1.47 | Not seen | 90 |
| C. Ex. 1 | A | 102 | 65 | 27 | 4 | 96 | 1.66 | Seen | 90 |
| Ex. 7 | B | 2 | 59 | 39 | 6 | 104 | 1.33 | Not seen | 90 |
| Ex. 8 | B | 33 | 91 | 30 | 12 | 133 | 1.36 | Not seen | 90 |
| Ex. 9 | B | 5 | 3 | 1 | <0.1 | 4 | 1.30 | Not seen | 90 |
| Ex. 10 | B | 40 | 23 | 9 | 3 | 35 | 1.34 | Not seen | 90 |
| Ex. 11 | B | 1 | 34 | 13 | 4 | 51 | 1.32 | Not seen | 90 |
| Ex. 12 | B | 94 | 3 | 2 | <0.1 | 5 | 1.38 | Not seen | 90 |
| C. Ex. 2 | B | 109 | 59 | 28 | 8 | 95 | 1.58 | Seen | 90 |

Ex.: Example
C. Ex.: Comparative Example

TABLE 3

| | | Manufacturing Example A | Manufacturing Example B | Manufacturing Example C | Manufacturing Example D |
|---|---|---|---|---|---|
| Type of pellet | — | 1A | 1B | 7C | 7D |
| Fe compound | ppb | less than 0.1 | 96 | less than 0.1 | 92 |
| Amide compounds | ppb | less than 0.1 | less than 0.1 | less than 0.1 | less than 0.1 |

EFFECT OF THE INVENTION

Since the granule used in the present invention has excellent heat resistance, according to the present invention, a molded article having excellent heat resistance, color and transparency and made from a polycarbonate resin can be manufactured. According to the present invention, the coloration of a molded article obtained by molding a granule of a polycarbonate resin is prevented, thereby making it possible to manufacture a molded article having excellent heat resistance, color and transparency.

INDUSTRIAL APPLICABILITY

The molded article manufacturing method of the present invention can be employed to manufacture various molded articles such as optical lenses and sheets.

The invention claimed is:

1. A method of manufacturing a molded article by melting and molding a granule of a polycarbonate resin at a temperature of 280 to 380° C., wherein the granule satisfies the following conditions (a) and (b):
   (a) when 100 parts by weight of the granule is cleaned with 100 parts by weight of a 1N nitric acid aqueous solution, the amount of an Fe compound eluted into the cleaning liquid of the 1N nitric acid aqueous solution is 1 to 100 ppb in terms of an Fe atom based on the granule; and
   (b) when 100 parts by weight of the granule is cleaned with 100 parts by weight of MeOH, the total amount of oleic amide, erucic amide and stearic amide eluted into the cleaning liquid of MeOH is 1 to 50 ppb based on the granule.

2. The method according to claim 1, wherein the molded article is an optical lens.

3. The method according to claim 1, wherein the molded article is a spectacle lens.

4. A method of preventing the coloration of a molded article when a granule of a polycarbonate resin is molded, wherein the granule satisfies the following condition (a):
   (a) when 100 parts by weight of the granule is cleaned with 100 parts by weight of a 1N nitric acid aqueous solution, the amount of an Fe compound eluted into the cleaning liquid of the 1N nitric acid aqueous solution is 1 to 100 ppb in terms of an Fe atom based on the granule.

5. The method according to claim 4, wherein the granule satisfies the following condition (b) in addition to the condition (a):
   (b) when 100 parts by weight of the granule is cleaned with 100 parts by weight of MeOH, the total amount of oleic amide, erucic amide and stearic amide eluted into the cleaning liquid of MeOH is 1 to 50 ppb based on the granule.

6. The method according to claim 4, wherein the molded article is an optical lens.

7. The method according to claim 4, wherein the molded article is a spectacle lens.

* * * * *